United States Patent
Ciano et al.

(10) Patent No.: US 11,163,844 B2
(45) Date of Patent: Nov. 2, 2021

(54) NETWORK SEARCH MODIFICATION (71) Applicant: INTERNATIONAL BUSINESS MACHINES CORPORATION, Armonk, NY (US)

(72) Inventors: Giuseppe Ciano, Fiumicino (IT); Damiano Vesperini, Rome (IT); Davide Di Meco, Rome (IT); Randa Salem, Rome (IT); Armando Panniello, Rome (IT)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 16/705,282

(22) Filed: Dec. 6, 2019

(65) Prior Publication Data
US 2021/0173881 A1  Jun. 10, 2021

(51) Int. Cl.
*G06F 15/16* (2006.01)
*G06F 16/9535* (2019.01)
*H04L 29/08* (2006.01)
*G06N 20/00* (2019.01)

(52) U.S. Cl.
CPC ......... *G06F 16/9535* (2019.01); *G06N 20/00* (2019.01); *H04L 67/02* (2013.01); *H04L 67/12* (2013.01)

(58) Field of Classification Search
CPC ...... H04L 67/02; H04L 67/12; G06F 16/9535
USPC ........................................................ 707/706
See application file for complete search history.

(56) References Cited

U.S. PATENT DOCUMENTS

| | | | | |
|---|---|---|---|---|
| 7,076,479 B1 * | 7/2006 | Cheung | ............... | G06Q 30/02 707/735 |
| 7,464,079 B2 * | 12/2008 | Soulanille | ............ | G06F 16/951 |
| 7,783,540 B2 * | 8/2010 | Davis | .................... | G06Q 30/08 705/35 |
| 8,429,740 B2 * | 4/2013 | Sokolan | ............. | G06F 21/6227 726/19 |
| 8,527,533 B2 * | 9/2013 | Davis | .................... | G06Q 40/00 707/765 |
| 8,874,567 B2 | 10/2014 | Haveliwala | | |
| 8,973,128 B2 * | 3/2015 | Sokolan | ............... | G06F 16/248 726/19 |

(Continued)

OTHER PUBLICATIONS

Anonymous; Method and System for a Context Based Search Exploiting Social Channel Information; IP.com; IPCOM000253783d; May 3, 2018; 5 pages.

(Continued)

*Primary Examiner* — Moustafa M Meky
(74) *Attorney, Agent, or Firm* — Schmeiser, Olsen & Watts; Christopher M. Pignato (57) ABSTRACT

A method, system, and computer program product for modifying and improving a network search is provided. The method includes receiving a search string associated with a search request of a user. The search string is transmitted to a search system. In response, initial search results associated with the search string are received and analyzed with respect to previous interactions and user preferences. Modified search results are generated from the initial search results and filter software is executed with respect to the modified search results. Digital tags are applied to portions of the modified search results and the modified search results are presented with respect to instructions associated with the digital tags.

20 Claims, 7 Drawing Sheets

(56) References Cited

U.S. PATENT DOCUMENTS

| | | | | |
|---|---|---|---|---|
| 9,262,527 B2* | 2/2016 | Geller | | G06F 16/3338 |
| 10,210,277 B2* | 2/2019 | McKenzie | | G06F 16/986 |
| 10,387,528 B2* | 8/2019 | Moussa | | G06F 16/951 |
| 2011/0040753 A1 | 2/2011 | Knight | | |
| 2012/0269116 A1 | 10/2012 | Xing | | |
| 2016/0110454 A1* | 4/2016 | McKenzie | | G06F 16/211 |
| | | | | 707/711 |
| 2016/0117395 A1* | 4/2016 | Geller | | G06F 16/90324 |
| | | | | 707/706 |
| 2016/0342695 A1 | 11/2016 | Lawrence | | |
| 2018/0173714 A1* | 6/2018 | Moussa | | G06F 16/958 |
| 2020/0210502 A1* | 7/2020 | Gan | | G06F 16/907 |

OTHER PUBLICATIONS

Qiu, Feng; Automatic Identification of User Interest for Personalized Search; Proceedings of the 15th International Conference on World Wide Web; May 23-26, 2006; pp. 727-736.

* cited by examiner

NETWORK SEARCH MODIFICATION

BACKGROUND

The present invention relates generally to a method for modifying network search results and in particular to a method and associated system for improving network technology associated with analyzing initial network search results with respect to previous interactions and preferences of a user and applying digital tags to modified search results for presentation with associated instructions.

SUMMARY

A first aspect of the invention provides a network search modification method comprising: receiving, by a processor of a hardware device from a user, a search string associated with a search request; transmitting, by the processor via a network interface controller, the search string to a search service system; receiving from the search service system, by the processor via the network interface controller, initial search results associated with the search string; analyzing, by the processor executing a supervisor component internal to the hardware device, the initial search results with respect to previous interactions and user preferences of the user; generating, by the processor based on results of the analyzing, modified search results from the initial search results; executing, by the processor, filter software with respect to the modified search results; applying, by the processor based on results of the executing, digital tags to portions of the modified search results, wherein the digital tags indicate that the portions are not recommended for the user; and presenting, by the processor to the user, the modified search results with respect to instructions associated with the digital tags.

A second aspect of the invention provides a computer program product, comprising a computer readable hardware storage device storing a computer readable program code, the computer readable program code comprising an algorithm that when executed by a processor of hardware device implements a network search modification method, the method comprising: receiving, by the processor from a user, a search string associated with a search request; transmitting, by the processor via a network interface controller, the search string to a search service system; receiving from the search service system, by the processor via the network interface controller, initial search results associated with the search string; analyzing, by the processor executing a supervisor component internal to the hardware device, the initial search results with respect to previous interactions and user preferences of the user; generating, by the processor based on results of the analyzing, modified search results from the initial search results; executing, by the processor, filter software with respect to the modified search results; applying, by the processor based on results of the executing, digital tags to portions of the modified search results, wherein the digital tags indicate that the portions are not recommended for the user; and presenting, by the processor to the user, the modified search results with respect to instructions associated with the digital tags.

A third aspect of the invention provides a hardware device comprising a processor coupled to a computer-readable memory unit, the memory unit comprising instructions that when executed by the processor implements a network search modification method comprising: receiving, by the processor from a user, a search string associated with a search request; transmitting, by the processor via a network interface controller, the search string to a search service system; receiving from the search service system, by the processor via the network interface controller, initial search results associated with the search string; analyzing, by the processor executing a supervisor component internal to the hardware device, the initial search results with respect to previous interactions and user preferences of the user; generating, by the processor based on results of the analyzing, modified search results from the initial search results; executing, by the processor, filter software with respect to the modified search results; applying, by the processor based on results of the executing, digital tags to portions of the modified search results, wherein the digital tags indicate that the portions are not recommended for the user; and presenting, by the processor to the user, the modified search results with respect to instructions associated with the digital tags.

The present invention advantageously provides a simple method and associated system capable of accurately modifying network search results.

DETAILED DESCRIPTION

Figure 1:
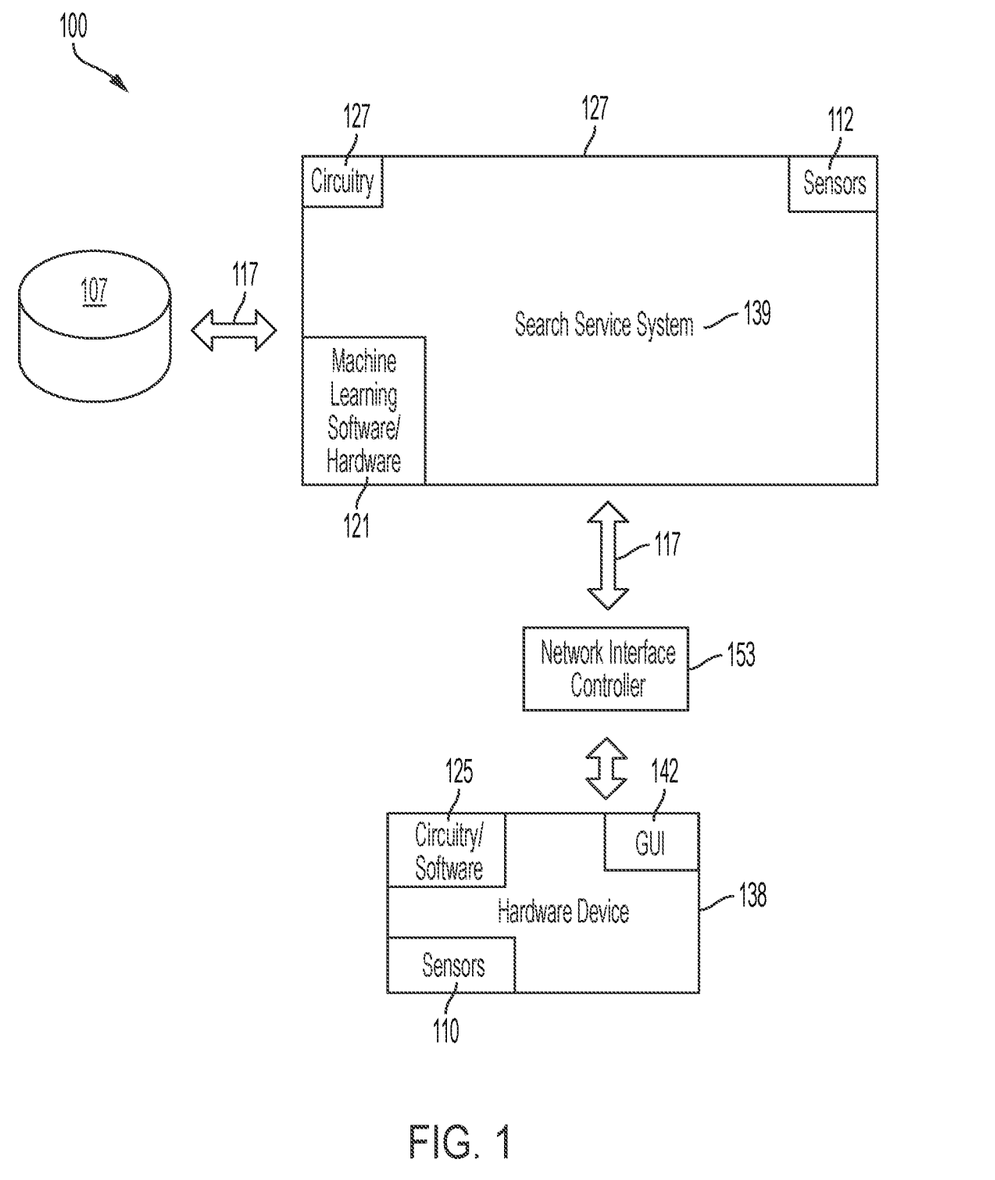
FIG. 1 illustrates a system for improving network technology associated with analyzing initial network search results with respect to previous interactions and preferences of a user and applying digital tags to modified search results for presentation with associated instructions, in accordance with embodiments of the present invention.

FIG. 1 illustrates a system 100 improving network technology associated with analyzing initial network search results with respect to previous interactions and preferences of a user and applying digital tags to modified search results for presentation with associated instructions, in accordance with embodiments of the present invention. A typical search engine comprises a means for retrieving information and executing indexing techniques for displaying results in a specified order based on relevance. However, generated results may not be reflective of a user's preferences and needs. Therefore, personal filtering code may be executed for avoiding excluding irrelevant information. Additionally, a typical user may omit viewing results because it is not relevant. Likewise, a typical user may omit viewing results because they may wish to avoid being exposed to specified data types based on personal navigation preferences. However, the aforementioned actions may not be captured and automated via usage of a browser thereby allowing content to be filtered or indexed with respect to a user's personal choice. Therefore, system 100 enables a process for generating a private browsing profile stored on a local device for usage by the Web browser.

System 100 generates and enables software code for privately and securely learning, capturing, and storing a user's Web browsing preferences and enabling a Web browser for using the personalized browsing preferences for generating post-filtering Web search results obtained from a network. Additionally, categories and types associated with user preferences are modified to include or exclude information from returned results. The modification process is performed by extrapolating the preferences from social tools for augmenting a Web browser's capabilities with a browser-learning component that is able to collect the preferences and store them locally on a user's device. The modification process is configured to generate machine learning code from the user's behavior with respect to scanning results to further feed the local browsing preferences with additional filtering and relevance indexing criteria prior to displaying the results to the user. The modification process is enabled via execution of a plug-in middleware software/hardware component that interacts with the Web browser's input/output and processes the results based on the local and private user preferences.

System 100 enables an improved network search as follows:

The network search is initiated when a user submits a query for execution via a search engine. The query is intercepted by a supervisor component (i.e., specialized hardware and software) for generating machine learning code comprising local and current user preferences. In response, the supervisor component revisits and updates its indexing to reflect the user preferences thereby dynamically omitting and re-ordering search results. Subsequently, the supervisor component transmits the search results back to be displayed for the user. An additional filter may be applied based on the user preferences for tagging/hiding information that is not recommended for the user.

System 100 is configured to privatize and secure browsing preferences for each user on an associated local device. Additionally, system 100 is enabled to allow a user to directly influence his or her browsing preferences by providing a GUI interface 142 with customizable criteria. System 100 is configured to modify search results as follows:

1. A search string is received from a GUI user interface of a local user device.
2. The search string is transmitted to a search service system via a network interface controller.
3. A search result is received from the search service system via the network interface controller. The search result may include multiple search result items.
4. A knowledge database is queried based on the search result and/or search string. The local user device includes a local memory structure for storing the knowledge database. First context information from the search string may be retrieved and inserted into the knowledge database. Additionally, second context information (differing from the first context information) may be retrieved and inserted into the knowledge database. The second context information may include: a set of applications run by the local device, a scope of usage associated with an application run by the local device, associated social media activities, etc.
5. The search result is modified based on a result of querying the knowledge database. Modifying the search result may include filtering search result items and/or reordering the search result items. The filtering or reordering process may be implemented based on based on the result of querying the knowledge database with respect to the search result and/or the search string.
6. The GUI user interface is configured to display the modified search result.

System 100 of FIG. 1 includes a search service system 139 (i.e., specialized hardware device), a hardware device 138, a network interface controller 153, and a database 107 (e.g., a cloud-based system) interconnected through a network 117. Search service system 139 includes specialized circuitry 127 (that may include specialized software), sensors 112, and machine learning software code/hardware structure 121 (i.e., including machine learning software code). Interface controller 153 may include any type of device or apparatus for securely interfacing hardware and software to a network. Hardware device 138 may include, inter alia, a smart phone, a tablet computer, a computing device, etc. Hardware device 138 may be Bluetooth enabled to provide connectivity to each other and any type of system. Hardware device 138 includes specialized circuitry 125 (that may include specialized software and a supervisor component), sensors 110, and a GUI 142. Sensors 110 and 112 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Search service system 139 and hardware device 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, search service system 139 and hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-8. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving network technology associated with analyzing initial network search results with respect to previous interactions and preferences of a user and applying digital tags to modified search results for presentation with associated instructions. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables the following implementation process for dynamically enabling a process revisiting and updating (by the supervisor component) indexing to reflect user preferences for dynamically omitting and re-ordering search results:

1. A context and current usage of a local user device with respect to a Web search is identified. The identification process may include retrieving a list of currently running software applications. For each detected software application, a scope of usage is retrieved. For example, a scope of usage may include usage associated with a company, leisure, vacation, etc. The identification process may be implemented by analyzing the currently running software applications and retrieving/deriving associated categories (e.g., company, leisure, shopping, vacation, etc.). When an associated category has been identified, then its usage is analyzed to enforce the context. The usage analysis may include, inter alia, analyzing content of an open file, Website content, etc. Likewise, the software application and associated context may be classified to obtain a confidence level that indicates a current scope of the software application. The classification process may be implemented using language classifiers.
2. Based on the detected usage (e.g., a topic or argument), associated relationships/data are retrieved from a listed repository Website.
3. Social channels are selected for retrieving relevant information. For example, based on the information retrieved in steps 1 and 2, a list of potential social channels L1, L2, L3, etc. (ordered by ranking) is retrieved.
4. Relevant information related to relationships between user context and a topic/argument is retrieved. For example, a query for a topic/Argument based information is executed with respect to the list of potential social channels (L1, L2, L3, etc.) and a process for verifying if a topic/argument include relationships with respect to identified context is enabled. Additionally, an index for each social channel mapping relationship between context and a topic/argument is generated (e.g., a number between 0 and 1) via the following equation:

$$Index_{SocialChannel} = \text{number of conversations with respect to context/number of conversations with person.}$$

5. A relationship index between a topic/argument for each context is calculated as follows:

$$\text{Relationshipindex} = \Sigma_{\forall socialchange} Index_{socialchannel}/\# \text{ of social channels.}$$

A relationship index calculated near to 1 indicates a strong relationship between a topic/argument and context. Likewise, a relationship index calculated near to 0 indicates no relationship. For example, the below chart illustrates a relationship index generated with respect to an application, a context, and a topic:

| Application | Context  | Topic                | Relationship Index |
|-------------|----------|----------------------|--------------------|
| Software 1  | Job      | Looking for position | 0.8                |
| Software 2  | Job      | Presenting           | 0.7                |
| Software 3  | Shopping | Sale                 | 0.1                |
| Software 4  | Personal | Makeup               | 0                  |

6. Actions are executed for applying filtering software (e.g., adding context, topic, keywords, etc.) associated with a variable greater than a configured relationship index value to a search query in order to perform a very effective search.
7. A user profile and preference database is populated with new information (e.g., context/topic/entity) related to the search query thereby allowing system 100 to enable cognitive functionality.

Figure 2:
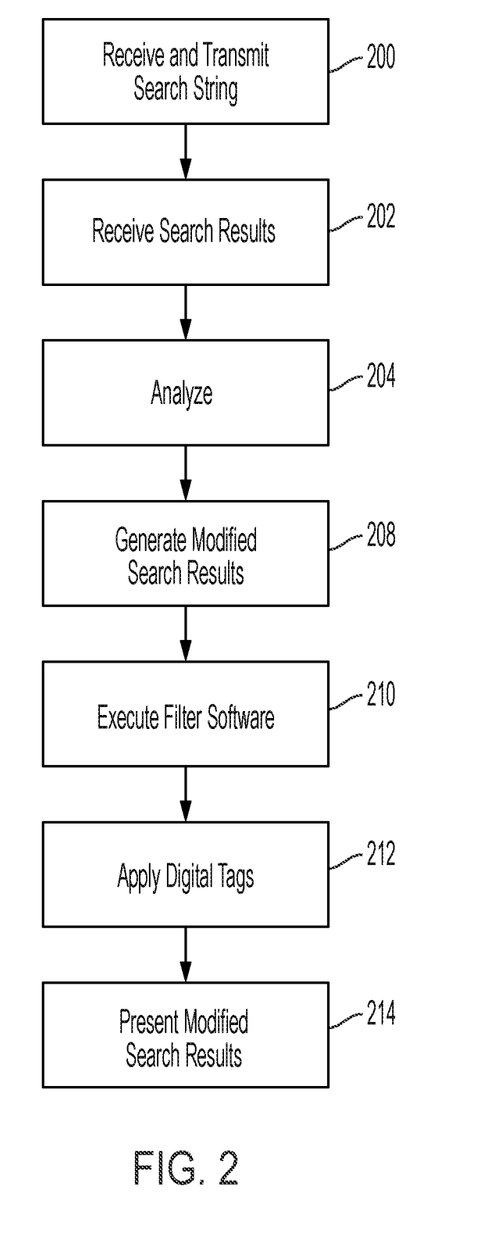
FIG. 2 illustrates an algorithm detailing a process flow enabled by the system of FIG. 1 for improving network technology associated with analyzing initial network search results with respect to previous interactions and preferences of a user and applying digital tags to modified search results for presentation with associated instructions, in accordance with embodiments of the present invention.

FIG. 2 illustrates an algorithm detailing a process flow enabled by system 100 of FIG. 1 for improving network technology associated with analyzing initial network search results with respect to previous interactions and preferences of a user and applying digital tags to modified search results for presentation with associated instructions, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by search service system 139 and hardware device 138. In step 200, a search string associated with a search request is received by a hardware device from a user. The search string is transmitted to a search service system via a network interface controller. In step 202, initial search results associated with the search string are received from the search service system via the network interface controller. In step 204, initial search results are analyzed (by a supervisor component internal to the hardware device) with respect to previous interactions and user preferences of the user. Analyzing the initial search results may include:

1. Querying a knowledge database (internal to the hardware device) comprising the previous interactions and user preferences of the user.
2. Retrieving first context information from the search string.
3. Inserting the first context information into the knowledge database.
4. Collecting (from the initial search results) second context information unrelated to the search string.
5. Inserting the second context information into the knowledge database. The second context information may include a set of applications run by the hardware device, a scope of usage associated with an application run by the hardware device, social media activities, etc.

Alternatively, analyzing the initial search results may include:

1. Identifying a context and current usage of the search string.
2. Retrieving data associated with the search string with respect to Web based information of the user.
3. Selecting Web channels associated with the Web based information.
4. Determining relationships between the user and the search string.
5. Determining relationship values associated with the relationships.
6. Generating actions (based on the relationship values) associated with filtering the initial search results. The actions are executed with respect to the filter software.
7. Generating (based on the actions) machine learning software code associated with executing future instances of a network search modification process.

In step 208, modified search results are generated from the initial search results based on results of the analysis of step 204. Generating the modified search results may include: filtering items of the initial search results based on the search string, the digital tags, and results of the query. Alternatively, generating the modified search results may include: reordering items of the initial search results based on the search string, the digital tags, and results of the query.

In step 210, filter software is executed with respect to the modified search results. In step 212, digital tags are applied to portions of the modified search results based on results of step 210. The digital tags indicate that the portions of the modified search results are not recommended for the user. In step 214, the modified search results are presented (to the user) with respect to instructions associated with the digital tags.

Figure 3:
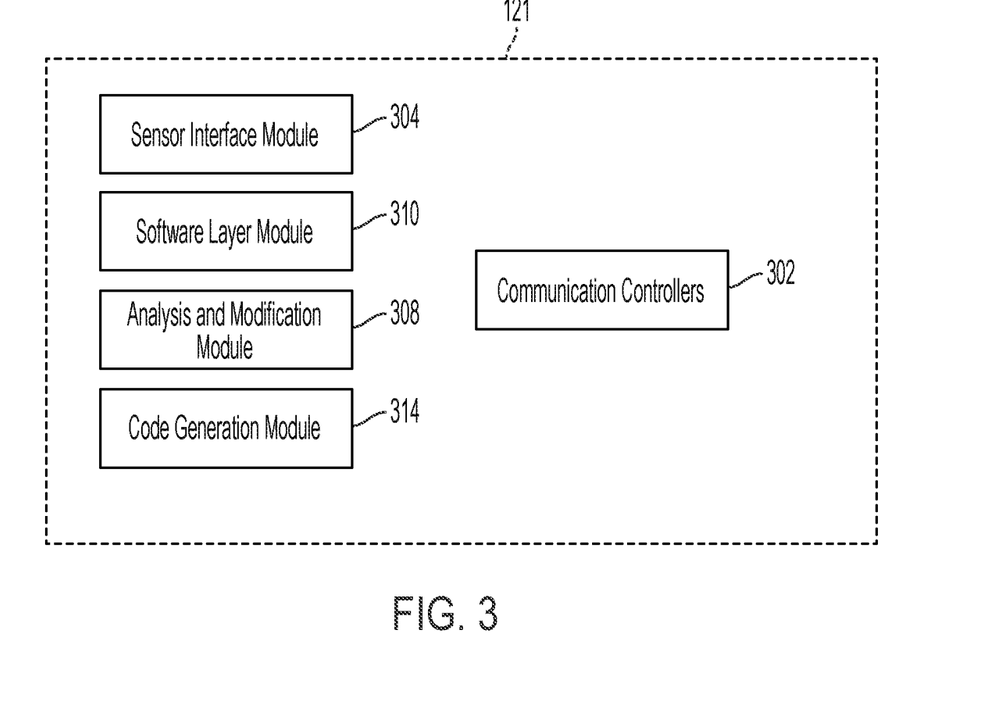
FIG. 3 illustrates an internal structural view of the machine learning software/hardware structure of FIG. 1, in accordance with embodiments of the present invention.

FIG. 3 illustrates an internal structural view of a machine learning software/hardware structure 121 (and/or circuitry 127 or 125), in accordance with embodiments of the present invention. Machine learning software/hardware structure 121 includes a sensor interface module 304, a software layer module 310, an analysis and modification module 308, a code generation module 314, and communication controllers 302. Sensor interface module 304 comprises specialized hardware and software for controlling all functions related to sensors 110 or 112 of FIG. 1. Software layer 310 comprises specialized hardware and software for controlling all functionality related control of all software layers, supervisor component, and filter software and for implementing the process described with respect to the algorithm of FIG. 2. Analysis and modification module 308 comprises specialized hardware and software for controlling all functions related to the analysis and modification steps of FIG. 2. Code generation module 314 comprises specialized hardware and software for controlling all functions related to generating machine learning feedback for generating machine learning software code for executing network search modification processes. Communication controllers 302 are enabled for controlling all communications between sensor interface module 304, software layer module 310, analysis and modification module 308, and code generation module 314.

Figure 4:
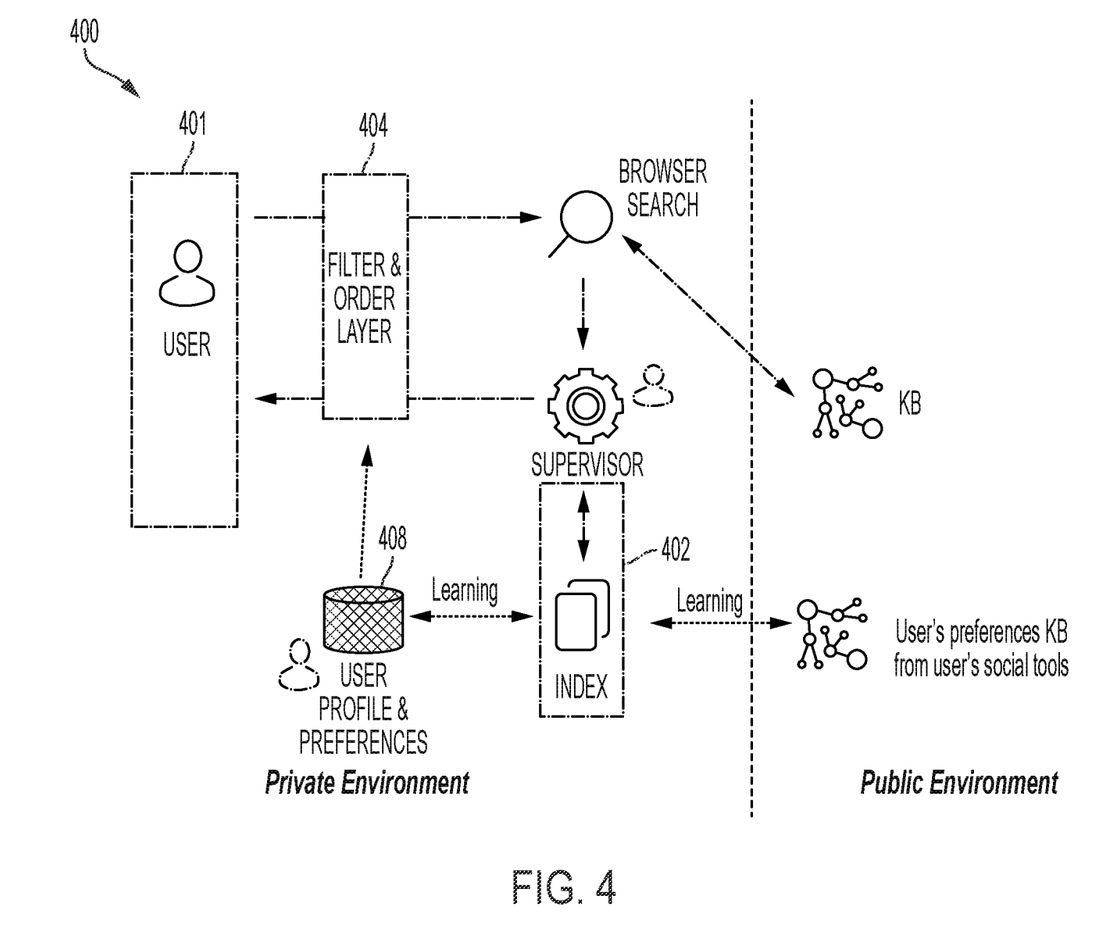
FIG. 4 illustrates core components of the system of FIG. 1, in accordance with embodiments of the present invention.

FIG. 4 illustrates core components 400 (with respect to a Web browser) of system 100 of FIG. 1, in accordance with embodiments of the present invention. Core components 400 include: a browsing supervisor 402 (software and hardware), a filtering layer 404 (software and hardware), and a personalized and local browsing-user-preference repository 408. Core components 400 execute a Web browsing process initiating a triggered user 401 search criterion for generating and fetching search results from the Web. Subsequently, an index is generated based on a detected relevance and search results are displayed to a user.

Browsing supervisor 402 comprises a machine learning capability such that it learns from a user's interaction overtime with a Web browser based on visited data vs a search. Additionally, browsing supervisor 402 detects topics that are typically omitted, skipped, etc. during a Web search. Browsing supervisor 402 is configured to execute a machine learning process with respect to software based social tools interacting with a user via a process for extracting stored preferences from specified software tools.

Browsing supervisor 402 comprises a preferences storing capability for storing user browsing preferences (from browsing user interactions and social tools) and revising indexing within a local repository within a user's local device. Browsing supervisor 402 is additionally configured for enabling a revised indexing capability process.

Filtering layer 404 is configured to execute a filtering and indexing process based on local preferences. A user preference version of returned results is displayed for the user. Additionally, browsing supervisor 402 detects the user preferences and initiates a process for building and storing user-browsing requirements locally with indexing preferences based on the user's browsing experience and history.

Figure 5:
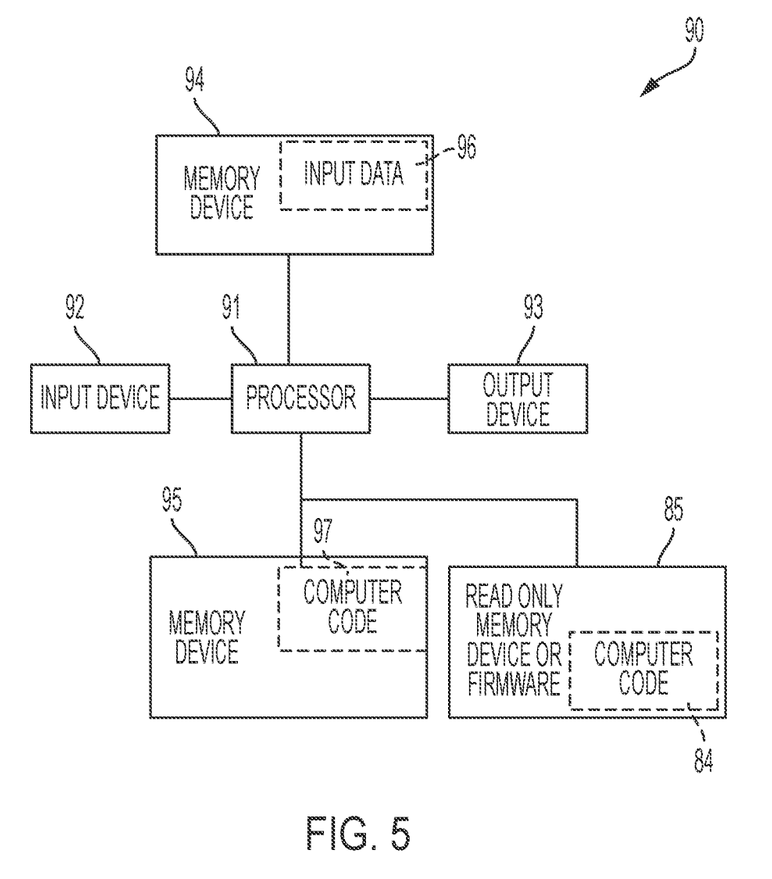
FIG. 5 illustrates a computer system used by the system of FIG. 1 for improving network technology associated with analyzing initial network search results with respect to previous interactions and preferences of a user and applying digital tags to modified search results for presentation with associated instructions, in accordance with embodiments of the present invention.

FIG. 5 illustrates a computer system 90 (e.g., hardware device 138 and/or search service system 138 of FIG. 1) used by or comprised by the system of FIG. 1 for improving network technology associated with analyzing initial network search results with respect to previous interactions and preferences of a user and applying digital tags to modified search results for presentation with associated instructions, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving hardware and software technology associated with identifying and resolving technical issues associated with hardware and software. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve network technology associated with analyzing initial network search results with respect to previous interactions and preferences of a user and applying digital tags to modified search results for presentation with associated instructions. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving network technology associated with analyzing initial network search results with respect to previous interactions and preferences of a user and applying digital tags to modified search results for presentation with associated instructions. In another embodiment, the invention provides a business method that performs the process steps of the invention on a subscription, advertising, and/or fee basis. That is, a service supplier, such as a Solution Integrator, could offer to enable a process for improving network technology associated with analyzing initial network search results with respect to previous interactions and preferences of a user and applying digital tags to modified search results for presentation with associated instructions. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
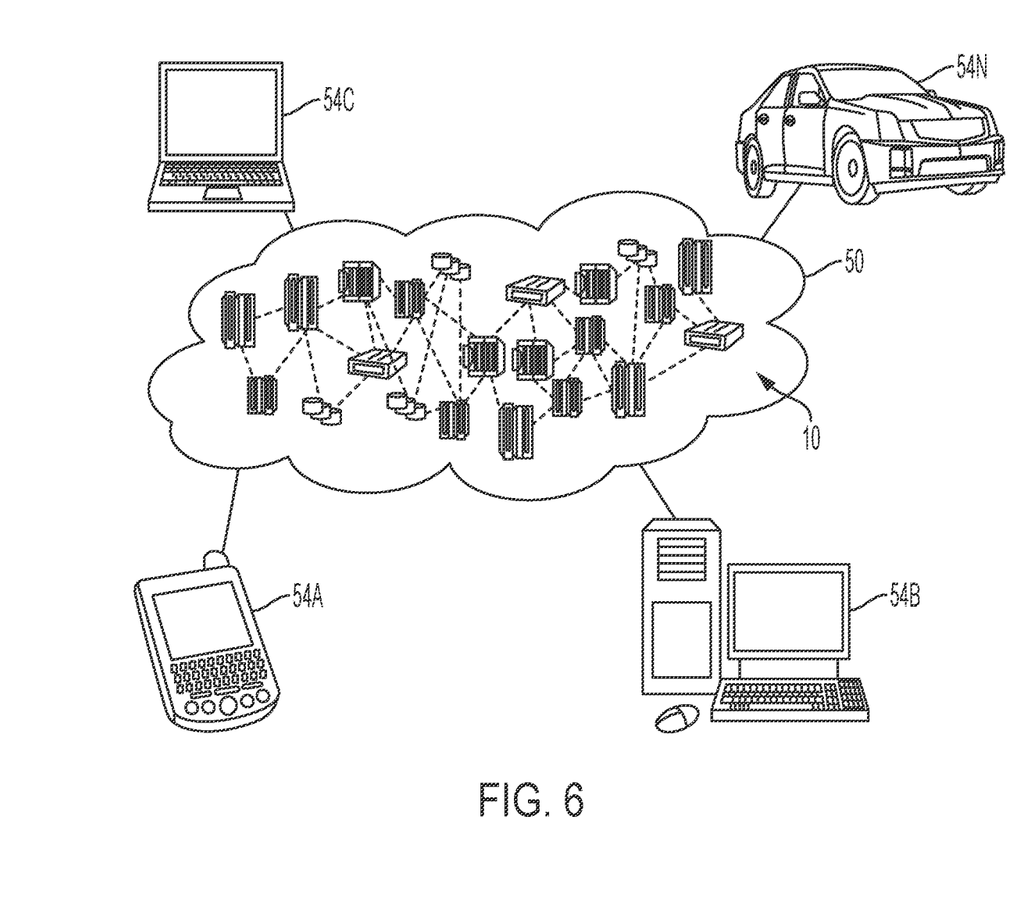
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
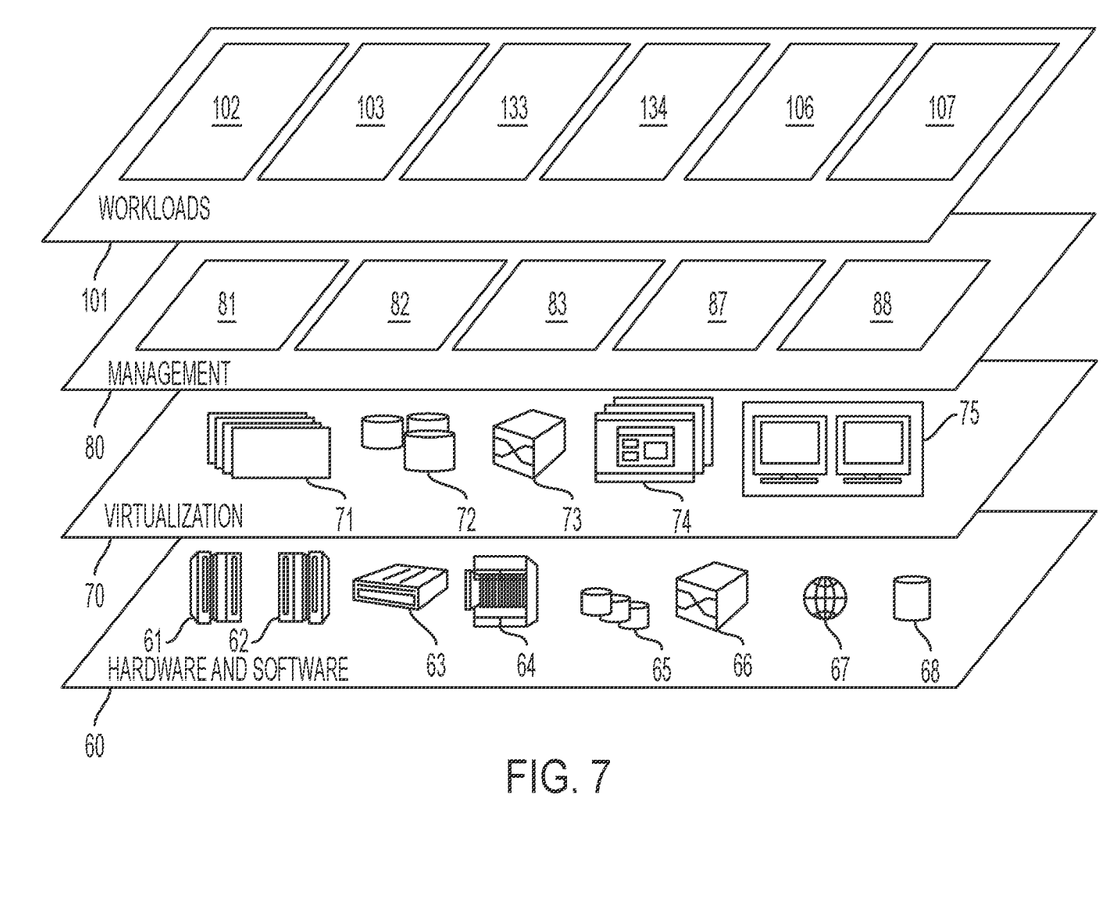
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving network technology associated with analyzing initial network search results with respect to previous interactions and preferences of a user and applying digital tags to modified search results for presentation with associated instructions 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A network search modification method comprising:
   receiving, by a processor of a hardware device from a user, a search string associated with a search request;
   transmitting, by said processor via a network interface controller, said search string to a search service system;
   receiving from said search service system, by said processor via said network interface controller, initial search results associated with said search string;
   analyzing, by said processor executing a supervisor component internal to said hardware device, said initial search results with respect to previous interactions and user preferences of said user;
   generating, by said processor based on results of said analyzing, modified search results from said initial search results;
   executing, by said processor, filter software with respect to said modified search results;
   applying, by said processor based on results of said executing, digital tags to portions of said modified search results, wherein said digital tags indicate that said portions are not recommended for said user; and
   presenting, by said processor to said user, said modified search results with respect to instructions associated with said digital tags.

2. The method of claim 1, wherein said analyzing said initial search results comprises:
   querying a knowledge database comprising said previous interactions and user preferences of said user, wherein said knowledge database is located internal to said hardware device, and wherein said knowledge database is only accessible by said user.

3. The method of claim 2, wherein said generating said modified search results comprises:
   filtering items of said initial search results based on said search string, said digital tags, and results of said querying.

4. The method of claim 2, wherein said generating said modified search results comprises:
   reordering items of said initial search results based on said search string, said digital tags, and results of said querying.

5. The method of claim 2, further comprising:
   retrieving, by said processor, first context information from said search string; and
   inserting, by said processor, said first context information into said knowledge database.

6. The method of claim 5, further comprising:
   collecting, by said processor from said initial search results, second context information unrelated to said search string; and
   inserting, by said processor, said second context information into said knowledge database.

7. The method of claim 6, wherein said second context information comprises information selected from the group consisting of a set of applications run by said processor, a scope of usage associated with an application run by said processor, and social media activities.

8. The method of claim 1, wherein said analyzing comprises:
　　identifying a context and current usage of said search string;
　　retrieving data associated with said search string with respect to Web based information of said user;
　　selecting Web channels associated with said Web based information;
　　determining relationships between said user and said search string;
　　determining relationship values associated with said relationships;
　　generating actions, based on said relationship values, associated with filtering said initial search results, wherein said actions are executed with respect to said filter software; and
　　generating, based on said actions, self-learning software code associated with executing future instances of said network search modification method.

9. The method of claim 1, further comprising:
　　providing at least one support service for at least one of creating, integrating, hosting, maintaining, and deploying computer-readable code in the control hardware, said code being executed by the computer processor to implement: said receiving said search string, said transmitting, said receiving said initial search results, said analyzing, said generating, said executing, said applying, and said presenting.

10. A computer program product, comprising a computer readable hardware storage device storing a computer readable program code, said computer readable program code comprising an algorithm that when executed by a processor of hardware device implements a network search modification method, said method comprising:
　　receiving, by said processor from a user, a search string associated with a search request;
　　transmitting, by said processor via a network interface controller, said search string to a search service system;
　　receiving from said search service system, by said processor via said network interface controller, initial search results associated with said search string;
　　analyzing, by said processor executing a supervisor component internal to said hardware device, said initial search results with respect to previous interactions and user preferences of said user;
　　generating, by said processor based on results of said analyzing, modified search results from said initial search results;
　　executing, by said processor, filter software with respect to said modified search results;
　　applying, by said processor based on results of said executing, digital tags to portions of said modified search results, wherein said digital tags indicate that said portions are not recommended for said user; and
　　presenting, by said processor to said user, said modified search results with respect to instructions associated with said digital tags.

11. The computer program product of claim 10, wherein said analyzing said initial search results comprises:
　　querying a knowledge database comprising said previous interactions and user preferences of said user, wherein said knowledge database is located internal to said hardware device, and wherein said knowledge database is only accessible by said user.

12. The computer program product of claim 11, wherein said generating said modified search results comprises:
　　filtering items of said initial search results based on said search string, said digital tags, and results of said querying.

13. The computer program product of claim 11, wherein said generating said modified search results comprises:
　　reordering items of said initial search results based on said search string, said digital tags, and results of said querying.

14. The computer program product of claim 11, wherein said method further comprises:
　　retrieving, by said processor, first context information from said search string; and
　　inserting, by said processor, said first context information into said knowledge database, wherein said knowledge database is only accessible by said user.

15. The computer program product of claim 14, wherein said method further comprises:
　　collecting, by said processor from said initial search results, second context information unrelated to said search string; and
　　inserting, by said processor, said second context information into said knowledge database, wherein said knowledge database is only accessible by said user.

16. The computer program product of claim 15, wherein said second context information comprises information selected from the group consisting of a set of applications run by said processor, a scope of usage associated with an application run by said processor, and social media activities.

17. The computer program product of claim 10, wherein said analyzing comprises:
　　identifying a context and current usage of said search string;
　　retrieving data associated with said search string with respect to Web based information of said user;
　　selecting Web channels associated with said Web based information;
　　determining relationships between said user and said search string;
　　determining relationship values associated with said relationships;
　　generating actions, based on said relationship values, associated with filtering said initial search results, wherein said actions are executed with respect to said filter software; and
　　generating, based on said actions, self-learning software code associated with executing future instances of said network search modification method.

18. A hardware device comprising a processor coupled to a computer-readable memory unit, said memory unit comprising instructions that when executed by the processor implements a network search modification method comprising:
　　receiving, by said processor from a user, a search string associated with a search request;
　　transmitting, by said processor via a network interface controller, said search string to a search service system;
　　receiving from said search service system, by said processor via said network interface controller, initial search results associated with said search string;
　　analyzing, by said processor executing a supervisor component internal to said hardware device, said initial search results with respect to previous interactions and user preferences of said user;
　　generating, by said processor based on results of said analyzing, modified search results from said initial search results;

executing, by said processor, filter software with respect to said modified search results;

applying, by said processor based on results of said executing, digital tags to portions of said modified search results, wherein said digital tags indicate that said portions are not recommended for said user; and presenting, by said processor to said user, said modified search results with respect to instructions associated with said digital tags.

19. The hardware device of claim 18, wherein said analyzing said initial search results comprises:

querying a knowledge database comprising said previous interactions and user preferences of said user, wherein said knowledge database is located internal to said hardware device, and wherein said knowledge database is only accessible by said user.

20. The hardware controller of claim 19, wherein said generating said modified search results comprises:

filtering items of said initial search results based on said search string, said digital tags, and results of said querying.

* * * * *